Sept. 29, 1970 J. L. EVANS ET AL 3,530,728
CONICAL LIQUID BEARING ASSEMBLY
Filed Aug. 8, 1968
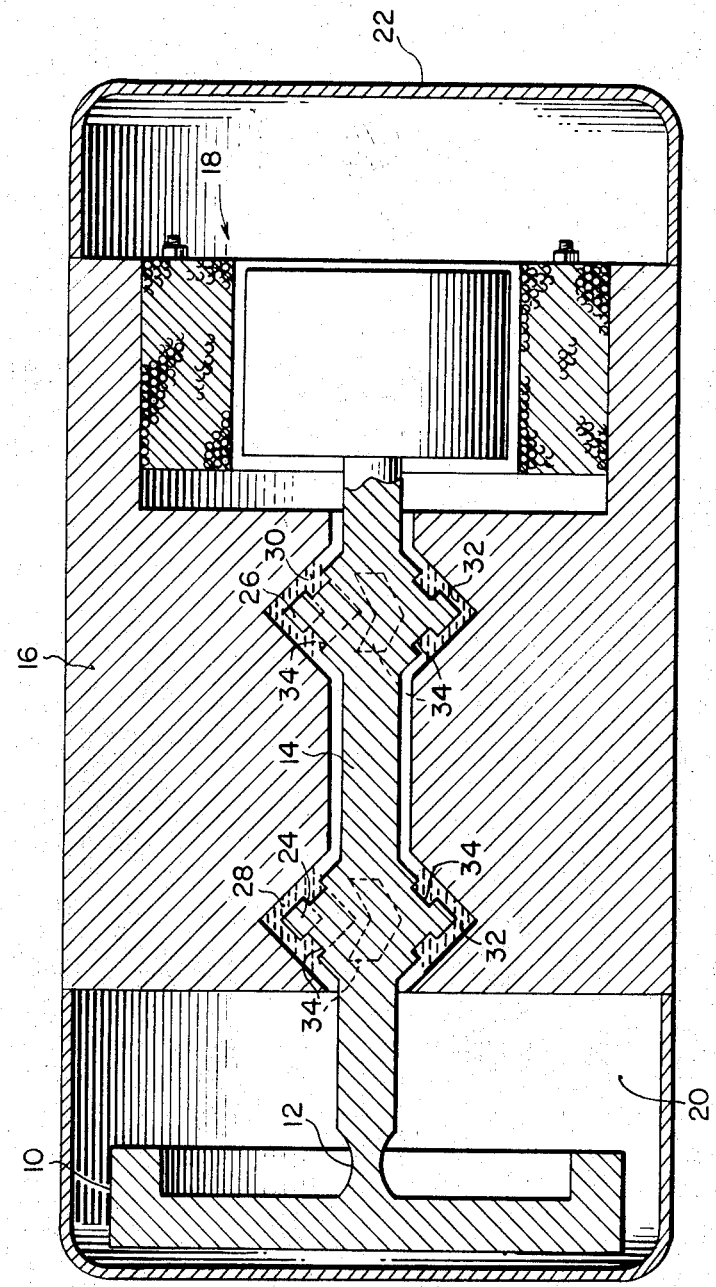
INVENTORS
JOHN L. EVANS &
JAY HOFFMAN
BY
ATTORNEY

United States Patent Office 3,530,728
Patented Sept. 29, 1970

---

3,530,728
CONICAL LIQUID BEARING ASSEMBLY
John L. Evans, Oakland, and Jay Hoffman, Livingston, N.J., assignors to Singer-General Precision, Inc., Little Falls, N.J., a corporation of Delaware
Filed Aug. 8, 1968, Ser. No. 751,178
Int. Cl. G01c *19/16*
U.S. Cl. 74—5                          2 Claims

ABSTRACT OF THE DISCLOSURE

A bearing assembly for a rotor rotatably mounted in a stator, in which at least one conical shaped annular cavity is formed in the stator and a corresponding conical shaped annular flange is formed on the rotor shaft, the flange extending within the cavity in a spaced relation from the wall thereof. A non-wetting liquid is disposed in the space between the flange and the wall of the cavity to provide a bearing between the rotor shaft and the stator.

BACKGROUND OF THE INVENTION

This invention relates to a bearing assembly, and more particularly to such an assembly provided between a rotor member and a stator member, or the like.

In applications requiring a very high speed rotation of a rotor shaft, such as in a navigational gyroscope, very high tolerances and mechanical precision are required, especially in regard to the bearings for the rotating member. For example, it has been proposed to utilize high quality ball bearings, which permit high speed rotation but otherwise suffer in several respects. Specifically, the ball bearings generate a high amount of noise, and suffer from high and unstable power consumption, in addition to providing an obstacle to heat flow from the motor driving the rotor, which causes the heat to pass through the rotating shaft and overheat same.

It also has been proposed to provide various types of liquid bearings between the rotating members. However, these bearings usually require a relatively complex structural arrangement in order to provide both a thrust and journal bearing action, in addition to being sensitive to rotor deflection due to the phenomenon commonly known as "half-speed whirl."

SUMMARY OF THE INVENTION

It is therefore an object of the present invention to provide a bearing between a high speed rotating member which is relatively quiet in operation, absorbs heat flow from the motor, enjoys a relatively low and stable power consumption, provides both a thrust and journal bearing action utilizing two surfaces, and is relatively insensitive to "half-speed whirl."

Briefly summarized, the arrangement of the present invention comprises a stator of a gyroscope or the like having a conical shaped annular cavity formed therein, and a corresponding conical shaped annular flange formed on the rotor shaft and extending in the stator cavity in a spaced relation from the wall thereof. A non-wetting liquid is disposed in the space between the flange and the wall of the cavity to provide a bearing between the rotor shaft and stator.

BRIEF DESCRIPTION OF THE DRAWING

Reference is now made to the accompanying drawing for a better understanding of the nature and objects of the bearing assembly of the present invention, which drawing illustrates the best mode presently contemplated for carrying out the objects of the invention and its principles, and is not to be construed as restricting or limiting its scope. The drawing is a cross-sectional view of a gyroscope utilizing the bearing assembly of the present invention.

DESCRIPTION OF THE PREFERRED EMBODIMENT

Referring specifically to the drawing, which shows a gyroscope incorporating the bearing assembly of the present invention, the reference numeral 10 refers to a gyro rotor which is supported by a flexure joint assembly 12 through a shaft 14 which is rotatably driven within a stator member 16 by means of a motor shown generally at 18. A cover 20 is provided for the rotor end of he assembly and a cover 22 is provided for the motor end, as shown. It is understood that the above components are of a conventional design generally well known in the art.

In accordance with the present invention, a pair of conical shaped annular flanges 24 and 26 are formed on the shaft 14 between the flexure joint 12 and the motor 18 and extend within a pair of cooperating cavities 28 and 30, respectively, formed in the stator member 16. A non-wetting fluid, such as a liquid metal, is shown at 32 and is disposed between each of the annular flanges 24 and 26 and their associated cavities 28 and 30, respectively, to provide a bearing for the shaft 14.

A plurality of grooves 34, extending in a herringbone pattern, may be provided in the flanges 24 and 26 in order to reduce the tendency of the fluid to whirl and increase the resistance of the fluid bearing to any deflection of the rotor with respect to the stator.

The fluid 32 has an internal pressure, due to its surface tension, which is sufficient to retain the fluid in the gaps between each flange and its corresponding cavity when the shaft 14 is not rotating.

In operation, a high speed torque is applied to the shaft 14 by means of the motor 18, causing the fluid 32 to experience a centrifugal acceleration that raises its pressure well above the ambient pressure. This centrifugal head provides a force that maintains the fluid in the gap opposing any acceleration forces that would tend to urge it out, and the differential shear rate of the fluid levitates the bearing when the rotor assumes an eccentric position with respect to the stator, due to acceleration or other external forces acting on the rotor.

It is noted that, as a result of the conical configuration of the flanges 24 and 26, thrust loads as well as transverse loads are supported adequately, and the heat generated from the motor 18 is absorbed by the fluid 32 and is therefore diverted from the shaft 14.

As a further feature of the present invention, the inner wall of the stator an dthe cavities 28 and 30 may be treated with a substance such as Teflon, or the like, to reduce the wetting thereof by the liquid metal or the like, which will increase the mean velocities of the latter and therefore increase the above-mentioned centrifugal force.

It is understood that several variations of the structure and arrangement of the present invention can be made within the scope of the invention. For example, although two flanges and cavities are provided on the rotor and stator, respectively, any number can be provided within the scope of the invention. Further, the positions of the stator and rotor can be interchanged, and/or the cavities can be provided on the rotor and the flanges on the stator. Also, the bearing assembly of the present invention is not restricted to use in gyroscopes, but can be used in any environment requiring a bearing assembly of very high tolerances and mechanical precision for supporting a high speed rotating member.

Of course, other variations of the specific construction and arrangement of the bearing assembly disclosed above can be made by those skilled in the art without departing from the invention as defined in the appended claims.

What is claimed is:

1. A gyroscope comprising a stator member, a rotor member disposed in said stator member, means to rotate said rotor member relative to said stator member, at least one conical shaped annular cavity formed in said stator member, at least one conical shaped annular flange formed on the shaft of said rotor member and extending in said cavity in a spaced relation from the wall thereof, said flange having a plurality of herringbone shaped grooves formed therein, and a liquid metal disposed in the space between said flange and said wall of said cavity and completely surrounding said grooves to provide a bearing between said members.

2. The combination of claim 1 further comprising means to reduce the wetting of the walls of said cavity by said fluid.

References Cited

UNITED STATES PATENTS

| | | | |
|---|---|---|---|
| 1,598,321 | 8/1926 | Sherwood | 308—241 |
| 3,262,744 | 7/1966 | Thomas | 308—240 |
| 2,581,965 | 1/1952 | Miller | 74—5 |
| 2,980,473 | 4/1961 | Tanis | 308—161 |
| 3,018,142 | 1/1962 | Warnock | 74—5 |
| 3,364,582 | 1/1968 | Hawk | 308—9 |

MANUEL A. ANTONAKAS, Primary Examiner

U.S. Cl. X.R.

308—161, 240